US010964947B2

(12) United States Patent
Takahashi

(10) Patent No.: US 10,964,947 B2
(45) Date of Patent: Mar. 30, 2021

(54) BINDER COMPOSITION FOR SECONDARY BATTERY ELECTRODE, SLURRY COMPOSITION FOR SECONDARY BATTERY ELECTRODE, ELECTRODE FOR SECONDARY BATTERY, AND SECONDARY BATTERY

(71) Applicant: ZEON CORPORATION, Tokyo (JP)

(72) Inventor: Naoki Takahashi, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 15/736,045

(22) PCT Filed: Jun. 28, 2016

(86) PCT No.: PCT/JP2016/003105
§ 371 (c)(1),
(2) Date: Dec. 13, 2017

(87) PCT Pub. No.: WO2017/002361
PCT Pub. Date: Jan. 5, 2017

(65) Prior Publication Data
US 2018/0183064 A1    Jun. 28, 2018

(30) Foreign Application Priority Data

Jun. 29, 2015  (JP) .............................. JP2015-130338

(51) Int. Cl.
H01M 4/62      (2006.01)
H01M 4/131     (2010.01)
C08L 47/00     (2006.01)
C08K 3/00      (2018.01)
C08F 8/04      (2006.01)
C08L 33/18     (2006.01)
C08F 220/42    (2006.01)
C08F 236/04    (2006.01)
H01M 4/1391    (2010.01)
C08F 220/44    (2006.01)
C08F 236/06    (2006.01)
C08K 3/04      (2006.01)
C08K 3/22      (2006.01)
C08L 27/16     (2006.01)
H01M 4/525     (2010.01)
H01M 10/0525   (2010.01)

(52) U.S. Cl.
CPC .............. H01M 4/622 (2013.01); C08F 8/04 (2013.01); C08F 220/42 (2013.01); C08F 220/44 (2013.01); C08F 236/04 (2013.01); C08F 236/06 (2013.01); C08K 3/00 (2013.01); C08K 3/04 (2013.01); C08K 3/22 (2013.01); C08L 27/16 (2013.01); C08L 33/18 (2013.01); C08L 47/00 (2013.01); H01M 4/131 (2013.01); H01M 4/1391 (2013.01); H01M 4/525 (2013.01); H01M 10/0525 (2013.01); C08F 2500/17 (2013.01); C08F 2800/20 (2013.01); C08K 2003/2293 (2013.01); C08K 2201/001 (2013.01); C08L 2203/20 (2013.01)

(58) Field of Classification Search
CPC ........ H01M 4/622; H01M 4/131; H01M 4/62; H01M 4/623; H01M 2/08; H01M 8/0213; C08F 8/04; C08F 220/42; C08F 2500/17; C08K 3/00; C08L 47/00; C08L 27/16
USPC ........................... 252/506; 429/174; 524/495
See application file for complete search history.

(56) References Cited

U.S. PATENT DOCUMENTS

| | | | | |
|---|---|---|---|---|
| 5,360,685 A | * | 11/1994 | Tanaka | H01M 2/08 429/174 |
| 2003/0191228 A1 | * | 10/2003 | Noguchi | H01M 8/0213 524/495 |
| 2007/0197688 A1 | * | 8/2007 | Tsukada | C08J 3/226 523/351 |
| 2013/0330622 A1 | | 12/2013 | Sasaki et al. | |
| 2014/0121329 A1 | | 5/2014 | Araki et al. | |
| 2014/0163170 A1 | * | 6/2014 | Nakashima | C08L 15/005 525/132 |
| 2015/0030922 A1 | | 1/2015 | Kobayashi et al. | |
| 2015/0044559 A1 | * | 2/2015 | Toyoda | H01M 4/13 429/217 |
| 2015/0050554 A1 | | 2/2015 | Fukumine et al. | |
| 2015/0083975 A1 | * | 3/2015 | Yeou | H01M 4/623 252/506 |
| 2016/0185890 A1 | | 6/2016 | Yoshimura | |
| 2016/0297955 A1 | * | 10/2016 | Inoue | C08L 13/00 |

FOREIGN PATENT DOCUMENTS

| | | | |
|---|---|---|---|
| EP | 2239297 A1 | 10/2010 | |
| JP | H08157677 A | 6/1996 | |
| JP | 2011074139 A | 4/2011 | |
| JP | 2012204303 A | 10/2012 | |
| JP | 2013-008485 A | * 1/2013 | ............ H01M 10/52 |

(Continued)

OTHER PUBLICATIONS

Acrylonitrile Butadiene Rubber (NBR) Chart by Epichem; http://epichem.ch/products/product-7.html.*

(Continued)

Primary Examiner — Khanh T Nguyen
(74) Attorney, Agent, or Firm — Kenja IP Law PC

(57) ABSTRACT

Provided is a binder composition for a secondary battery electrode that, when used in production of a slurry composition for a secondary battery electrode, enables favorable dispersion of an electrode active material and a conductive material in high concentration while ensuring coatability. The binder composition for a secondary battery electrode contains a binder. The binder includes a copolymer that includes an alkylene structural unit and a nitrile group-containing monomer unit, and that has a Mooney viscosity ($ML_{1+4}$, 100° C.) of at least 50 and not more than 200.

9 Claims, No Drawings

(56) References Cited

FOREIGN PATENT DOCUMENTS

| | | | |
|---|---|---|---|
| JP | 2013008485 A | 1/2013 | |
| JP | 2013206598 A | 10/2013 | |
| KR | 1020140047656 A | 4/2014 | |
| KR | 1020140148378 A | 12/2014 | |
| KR | 1020150033439 A | 4/2015 | |
| WO | 2005092971 A1 | 10/2005 | |
| WO | 2012115096 A1 | 8/2012 | |
| WO | 2012165120 A1 | 12/2012 | |
| WO | 2013015373 A1 | 1/2013 | |
| WO | 2013080989 A1 | 6/2013 | |
| WO | 2013084990 A1 | 6/2013 | |
| WO | 2015046559 A1 | 4/2015 | |
| WO | WO 2015-080130 A1 * | 6/2015 | ............. C08K 5/103 |

OTHER PUBLICATIONS

Jan. 2, 2018, International Preliminary Report on Patentability issued in the International Patent Application No. PCT/JP2016/003105.

Jan. 19, 2018, Communication pursuant to Rule 114(2) EPC issued by the European Patent Office in the corresponding European Patent Application No. 16817471.2

Nov. 2, 2017, PCT Third Party Observation issued in the International Patent Application No. PCT/JP2016/003105.

Nov. 7, 2018, the Extended European Search Report issued by the European Patent Office in the corresponding European Patent Application No. 16817471.2.

Nov. 26, 2019, Communication pursuant to Rule 114(2) EPC issued by the European Patent Office in the corresponding European Patent Application No. 16817471.2.

Feb. 4, 2020, Communication pursuant to Article 94(3) EPC issued by the European Patent Office in the corresponding European Patent Application No. 16817471.2.

Arlanxeo, "Product Specification Stabilizer Non-staining Solubility Soluble in MEK", May 19, 2016, XP55662364, retrieved from the internet, retrieved on Jan. 28, 2020, from URL: http://techcenter.arlanxeo.com/hpe/emea/en/products/datasheet/THERBAN_4307_ARL_02.pdf?docId=35605672&gid=12805024&pid=31.

Oct. 12, 2020, Communication pursuant to Article 94(3) EPC issued by the European Patent Office in the corresponding European Patent Application No. 16817471.2.

* cited by examiner

BINDER COMPOSITION FOR SECONDARY BATTERY ELECTRODE, SLURRY COMPOSITION FOR SECONDARY BATTERY ELECTRODE, ELECTRODE FOR SECONDARY BATTERY, AND SECONDARY BATTERY

TECHNICAL FIELD

This disclosure relates to a binder composition for a secondary battery electrode, a slurry composition for a secondary battery electrode, an electrode for a secondary battery, and a secondary battery.

BACKGROUND

Secondary batteries such as lithium ion secondary batteries have characteristics such as compact size, light weight, high energy-density, and the ability to be repeatedly charged and discharged, and are used in a wide range of applications. Therefore, studies have been carried out in recent years with the objective of further raising the performance of secondary batteries through improvement of electrodes and other battery components.

An electrode used in a secondary battery such as a lithium ion secondary battery normally includes a current collector and an electrode mixed material layer (positive electrode mixed material layer or negative electrode mixed material layer) formed on the current collector. This electrode mixed material layer is formed by, for example, applying a slurry composition containing an electrode active material, a binder-containing binder composition, and so forth onto the current collector, and then drying the applied slurry composition.

In order to further improve the performance of secondary batteries, attempts have been made in recent years to improve binder compositions used in electrode mixed material layer formation.

In one specific example described in PTL 1, a binder composition containing, as a binder, a diene polymer hydrogenated product obtained through hydrogenation of an unsaturated nitrile-conjugated diene copolymer to an iodine value of 120 or less is used to enable strong adherence between an electrode active material and a current collector, and to improve secondary battery cycle characteristics.

CITATION LIST

Patent Literature

PTL 1: JP H8-157677 A

SUMMARY

Technical Problem

An electrode mixed material layer, and particularly a positive electrode mixed material layer, of a secondary battery may contain a conductive material to ensure electrical contact amongst an electrode active material. Moreover, in a slurry composition used in formation of an electrode mixed material layer that contains a conductive material, it is necessary to favorably disperse an electrode active material and a conductive material in high concentration while ensuring coatability from a viewpoint of enabling favorable formation of the electrode mixed material layer and improving secondary battery performance.

However, in a slurry composition containing an electrode active material, a conductive material, and the conventional binder composition described above, there are cases in which it has not been possible to favorably disperse the electrode active material and the conductive material in high concentration while ensuring coatability. Consequently, it has not been possible to favorably form an electrode mixed material layer having high density and uniformity in an electrode formed using a slurry composition that contains an electrode active material, a conductive material, and the conventional binder composition described above, and thus it has not been possible to sufficiently improve battery characteristics such as output characteristics in a secondary battery that includes such an electrode.

Accordingly, an objective of this disclosure is to provide a binder composition for a secondary battery electrode that, when used in production of a slurry composition for a secondary battery electrode, enables favorable dispersion of an electrode active material and a conductive material in high concentration while ensuring coatability.

Another objective of this disclosure is to provide a slurry composition for a secondary battery electrode in which an electrode active material and a conductive material are favorably dispersed in high concentration while ensuring coatability.

Yet another objective of this disclosure is to provide an electrode for a secondary battery that enables sufficient improvement of battery characteristics of a secondary battery and a secondary battery having excellent battery characteristics such as output characteristics.

Solution to Problem

The inventor conducted diligent investigation with the aim of solving the problems set forth above. Through this investigation, the inventor discovered that it is possible to obtain a slurry composition for a secondary battery electrode in which an electrode active material and a conductive material are favorably dispersed in high concentration while ensuring coatability by using a binder composition for a secondary battery electrode that contains, as a binder, a copolymer including an alkylene structural unit and a nitrile group-containing monomer unit, and having a specific Mooney viscosity ($ML_{1+4}$, 100° C.). The present disclosure was completed based on this discovery.

Specifically, this disclosure aims to advantageously solve the problems set forth above by disclosing a binder composition for a secondary battery electrode comprising a binder, wherein the binder includes a copolymer that includes an alkylene structural unit and a nitrile group-containing monomer unit, and that has a Mooney viscosity ($ML_{1+4}$, 100° C.) of at least 50 and not more than 200. When a copolymer including an alkylene structural unit and a nitrile group-containing monomer unit, and having a Mooney viscosity ($ML_{1+4}$, 100° C.) of at least 50 and not more than 200 is included as a binder as set forth above, is it possible to favorably disperse an electrode active material and a conductive material in high concentration while ensuring coatability when the binder composition for a secondary battery electrode is used to produce a slurry composition for a secondary battery electrode.

In this disclosure, the "Mooney viscosity ($ML_{1+4}$, 100° C.)" can be measured in accordance with JIS K 6300-1 at a temperature of 100° C.

In the presently disclosed binder composition for a secondary battery electrode, the copolymer preferably includes the alkylene structural unit in a proportion of at least 40 mass % and not more than 80 mass %. As a result of the proportion constituted by the alkylene structural unit in the copolymer being at least 40 mass % and not more than 80 mass %, conductive material dispersibility in production of a slurry composition for a secondary battery electrode can be further increased.

In this disclosure, the proportions constituted by repeating units (structural units and monomer units) in the copolymer can be measured by a nuclear magnetic resonance (NMR) method such as $^1$H-NMR.

In the presently disclosed binder composition for a secondary battery electrode, the copolymer preferably includes the nitrile group-containing monomer unit in a proportion of at least 10 mass % and not more than 55 mass %. As a result of the proportion constituted by the nitrile group-containing monomer unit in the copolymer being at least 10 mass % and not more than 55 mass %, it is possible to increase the peel strength and flexibility of an electrode mixed material layer formed using a slurry composition for a secondary battery electrode that contains the binder composition for a secondary battery electrode.

In the presently disclosed binder composition for a secondary battery electrode, the copolymer preferably does not substantially include a hydrophilic group-containing monomer unit. As a result of the copolymer not substantially including a hydrophilic group-containing monomer unit, conductive material dispersibility in production of a slurry composition for a secondary battery electrode can be further increased.

In this disclosure, "does not substantially include a hydrophilic group-containing monomer unit" means that the proportion constituted by a hydrophilic group-containing monomer unit among all repeating units in the copolymer is 0% or more, but less than 0.05 mass %.

Moreover, this disclosure aims to advantageously solve the problems set forth above by disclosing a slurry composition for a secondary battery electrode comprising: an electrode active material; a conductive material; and any one of the binder compositions for a secondary battery electrode set forth above. Through use of any of the foregoing binder compositions for a secondary battery electrode in this manner, a slurry composition for a secondary battery electrode in which an electrode active material and a conductive material are favorably dispersed in high concentration while ensuring coatability can be obtained.

In the presently disclosed slurry composition for a secondary battery electrode, the electrode active material preferably includes a Ni-containing active material and the binder preferably includes the copolymer in a proportion of 60 mass % or more. As a result of the binder including the copolymer in a proportion of 60 mass % or more in a case in which the electrode active material includes a Ni-containing active material, stability and coatability of the slurry composition for a secondary battery electrode can be increased.

Furthermore, this disclosure aims to advantageously solve the problems set forth above by disclosing an electrode for a secondary battery comprising an electrode mixed material layer formed using any one of the slurry compositions for a secondary battery electrode set forth above. Use of any one of the foregoing slurry compositions for a secondary battery electrode in this manner enables favorable formation of the electrode mixed material layer and sufficient improvement of battery characteristics of a secondary battery in which the electrode for a secondary battery is used.

Also, this disclosure aims to advantageously solve the problems set forth above by disclosing a secondary battery comprising the electrode for a secondary battery set forth above. Use of the foregoing electrode for a secondary battery in this manner enables sufficient improvement of battery characteristics such as output characteristics.

Advantageous Effect

According to this disclosure, it is possible to provide a binder composition for a secondary battery electrode that, when used in production of a slurry composition for a secondary battery electrode, enables favorable dispersion of an electrode active material and a conductive material in high concentration while ensuring coatability.

Moreover, according to this disclosure, it is possible to provide a slurry composition for a secondary battery electrode in which an electrode active material and a conductive material are favorably dispersed in high concentration while ensuring coatability.

Furthermore, according to this disclosure, it is possible to provide an electrode for a secondary battery that enables sufficient improvement of battery characteristics of a secondary battery and a secondary battery having excellent battery characteristics such as output characteristics.

DETAILED DESCRIPTION

The following provides a detailed description of embodiments of the present disclosure.

Herein, the presently disclosed binder composition for a secondary battery electrode can be used in production of a slurry composition for a secondary battery electrode. Moreover, a slurry composition for a secondary battery electrode produced using the presently disclosed binder composition for a secondary battery electrode can be used in formation of an electrode for a secondary battery such as a lithium ion secondary battery. Furthermore, a feature of the presently disclosed secondary battery is that an electrode for a secondary battery formed using the presently disclosed slurry composition for a secondary battery electrode is used therein.

Note that the presently disclosed binder composition for a secondary battery electrode and slurry composition for a secondary battery electrode can be particularly suitably used in formation of a secondary battery positive electrode.

(Binder Composition for Secondary Battery Electrode)

The presently disclosed binder composition for a secondary battery electrode contains a binder and a solvent, and may optionally further contain other components that can be used in secondary battery electrodes. Moreover, a feature of the presently disclosed binder composition for a secondary battery electrode is that the binder includes a copolymer including an alkylene structural unit and a nitrile group-containing monomer unit, and having a Mooney viscosity (ML$_{1+4}$, 100° C.) of at least 50 and not more than 200.

The presently disclosed binder composition for a secondary battery electrode enables favorable dispersion of a conductive material when used in production of a slurry composition for a secondary battery electrode as a result of containing a copolymer that includes an alkylene structural unit as the binder. Moreover, the presently disclosed binder composition for a secondary battery electrode enables an electrode mixed material layer formed using the binder composition for a secondary battery electrode to display excellent peel strength and flexibility as a result of containing a copolymer that includes a nitrile group-containing monomer unit as the binder. Furthermore, the presently disclosed binder composition for a secondary battery electrode enables favorable dispersion of an electrode active material when used in production of a slurry composition for a secondary battery electrode as a result of the Mooney viscosity of the copolymer being 50 or more. In addition, the presently disclosed binder composition for a secondary battery electrode enables favorable dispersion of an electrode active material and a conductive material in high concentration while ensuring coatability as a result of the Mooney viscosity of the copolymer being 200 or less. Accordingly, through use of the presently disclosed binder composition for a secondary battery electrode, it is possible to produce a slurry composition for a secondary battery electrode in which an electrode active material and a conductive material are favorably dispersed in high concentration while ensuring coatability, and it is possible to form an electrode mixed material layer of an electrode using this slurry composition for a secondary battery electrode such as to obtain a secondary battery having excellent battery characteristics such as output characteristics.

<Binder>

In an electrode produced by forming an electrode mixed material layer on a current collector using a slurry composition for a secondary battery electrode produced using the binder composition, the binder holds components contained in the electrode mixed material layer so that these components do not detach from the electrode mixed material layer. The presently disclosed binder composition for a secondary battery electrode contains at least a copolymer including an alkylene structural unit and a nitrile group-containing monomer unit, and having a Mooney viscosity of at least 50 and not more than 200 as the binder, and may optionally further contain other polymers as the binder.

[Copolymer]

The copolymer is required to include an alkylene structural unit and a nitrile group-containing monomer unit as repeating units, and may optionally further include repeating units other than the alkylene structural unit and the nitrile group-containing monomer unit (hereinafter, also referred to as "other repeating units").

[[Alkylene Structural Unit]]

The alkylene structural unit is a repeating unit composed only of an alkylene structure represented by a general formula $-C_nH_{2n}-$ (n is an integer of 2 or more). As a result of the copolymer including the alkylene structural unit, when the copolymer is used in production of a slurry composition for a secondary battery electrode that contains a conductive material, dispersibility of the conductive material can be improved and aggregation of the conductive material in the slurry composition can be inhibited, which can improve dispersion stability of the slurry composition.

Although the alkylene structural unit may be linear or branched, the alkylene structural unit is preferably linear (i.e., the alkylene structural unit is preferably a linear alkylene structural unit) from a viewpoint of further improving dispersion stability of a slurry composition for a secondary battery electrode. Moreover, the carbon number of the alkylene structural unit is preferably 4 or more (i.e., n in the preceding general formula is preferably an integer of 4 or more) from a viewpoint of further improving dispersion stability of a slurry composition for a secondary battery electrode.

Examples of methods by which the alkylene structural unit can be introduced into the copolymer include, but are not specifically limited to, the following methods (1) and (2).

(1) A method involving producing a copolymer from a monomer composition containing a conjugated diene monomer, and hydrogenating the resultant copolymer to convert a conjugated diene monomer unit to an alkylene structural unit (2) A method involving producing a copolymer from a monomer composition containing a 1-olefin monomer Of these methods, method (1) is preferable in terms of ease of production of the copolymer.

Examples of conjugated diene monomers that can be used include conjugated diene compounds having a carbon number of 4 or more such as 1,3-butadiene, isoprene, 2,3-dimethyl-1,3-butadiene, and 1,3-pentadiene. Of these conjugated diene monomers, 1,3-butadiene is preferable. In other words, the alkylene structural unit is preferably a structural unit obtained through hydrogenation of a conjugated diene monomer unit (i.e., the alkylene structural unit is preferably a hydrogenated conjugated diene unit), and is more preferably a structural unit obtained through hydrogenation of a 1,3-butadiene unit (i.e. the alkylene structural unit is more preferably a hydrogenated 1,3-butadiene unit). Selective hydrogenation of the conjugated diene monomer unit can be carried out by a commonly known method such as an oil-layer hydrogenation method or a water-layer hydrogenation method.

Examples of 1-olefin monomers that can be used include ethylene, propylene, 1-butene, and 1-hexene.

One of these conjugated diene monomers or 1-olefin monomers may be used individually, or two or more of these conjugated diene monomers or 1-olefin monomers may be used in combination.

The percentage content of the alkylene structural unit in the copolymer when all repeating units (total of structural units and monomer units) in the copolymer are taken to be 100 mass % is preferably 40 mass % or more, more preferably 50 mass % or more, and even more preferably 60 mass % or more, and is preferably 80 mass % or less, and more preferably 70 mass % or less. When the percentage content of the alkylene structural unit is set as at least any of the lower limits set forth above, conductive material dispersibility in a slurry composition can be further improved, and slurry composition dispersion stability can be sufficiently increased. Moreover, when the percentage content of the alkylene structural unit is set as not more than any of the upper limits set forth above, reduction in solubility of the copolymer in solvents such as N-methylpyrrolidone (NMP) can be inhibited and the copolymer can display a sufficient conductive material dispersing effect.

[[Nitrile Group-Containing Monomer Unit]]

The nitrile group-containing monomer unit is a repeating unit that is derived from a nitrile group-containing monomer. The copolymer can display excellent flexibility and binding capacity as a result of including the nitrile group-containing monomer unit. Consequently, an electrode mixed material layer that is formed using a slurry composition for a secondary battery electrode containing the presently disclosed binder composition for a secondary battery electrode can display excellent peel strength and flexibility.

Examples of nitrile group-containing monomers that can be used to form the nitrile group-containing monomer unit include α,β-ethylenically unsaturated nitrile monomers. Specifically, any α,β-ethylenically unsaturated compound that has a nitrile group can be used as an α,β-ethylenically unsaturated nitrile monomer without any specific limitations. Examples include acrylonitrile; α-halogenoacrylonitriles such as α-chloroacrylonitrile and α-bromoacrylonitrile; and α-alkylacrylonitriles such as methacrylonitrile and α-ethylacrylonitrile. Of these monomers, acrylonitrile and methacrylonitrile are preferable, and acrylonitrile is more preferable as a nitrile group-containing monomer from a viewpoint of increasing binding capacity of the copolymer.

One of these nitrile group-containing monomers may be used individually, or two or more of these nitrile group-containing monomers may be used in combination.

The percentage content of the nitrile group-containing monomer unit in the copolymer when all repeating units in the copolymer are taken to be 100 mass % is preferably 10 mass % or more, more preferably 20 mass % or more, even more preferably 25 mass % or more, and particularly preferably 30 mass % or more, and is preferably 55 mass % or less, more preferably 50 mass % or less, and even more preferably 40 mass % or less. When the percentage content of the nitrile group-containing monomer unit in the copolymer is set as at least any of the lower limits set forth above, binding capacity of the copolymer can be improved, and peel strength of an electrode mixed material layer formed using the binder composition can be sufficiently increased. Moreover, when the percentage content of the nitrile group-containing monomer unit in the copolymer is set as not more than any of the upper limits set forth above, flexibility of the copolymer can be increased, which suppresses reduction in flexibility of an electrode mixed material layer formed using the binder composition.

[[Other Repeating Units]]

No specific limitations are placed on other repeating units that may be included besides the alkylene structural unit and the nitrile group-containing monomer unit. Examples of such other repeating units include repeating units derived from known monomers that are copolymerizable with the monomers described above, such as a (meth)acrylic acid ester monomer unit and a hydrophilic group-containing monomer unit. Moreover, such other repeating units may include an aromatic vinyl monomer unit derived from an aromatic vinyl monomer such as styrene, α-methylstyrene, butoxystyrene, or vinylnaphthalene.

One of these monomers may be used individually, or two or more of these monomers may be used in combination. Note that in this disclosure, "(meth)acryl" is used to indicate "acryl" and/or "methacryl".

Examples of (meth)acrylic acid ester monomers that can be used to form the (meth)acrylic acid ester monomer unit include alkyl esters of acrylic acid such as methyl acrylate, ethyl acrylate, n-propyl acrylate, isopropyl acrylate, n-butyl acrylate, t-butyl acrylate, isobutyl acrylate, n-pentyl acrylate, isopentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and alkyl esters of methacrylic acid such as methyl methacrylate, ethyl methacrylate, n-propyl methacrylate, isopropyl methacrylate, n-butyl methacrylate, t-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate.

Examples of hydrophilic group-containing monomers that can be used to form the hydrophilic group-containing monomer unit include polymerizable monomers that have a hydrophilic group. Specific examples of hydrophilic group-containing monomers include carboxylic acid group-containing monomers, sulfonate group-containing monomers, phosphate group-containing monomers, and hydroxy group-containing monomers.

Examples of carboxylic acid group-containing monomers include monocarboxylic acids, derivatives of monocarboxylic acids, dicarboxylic acids, acid anhydrides of dicarboxylic acids, and derivatives of these dicarboxylic acids and acid anhydrides.

Examples of monocarboxylic acids include acrylic acid, methacrylic acid, and crotonic acid.

Examples of derivatives of monocarboxylic acids include 2-ethylacrylic acid, isocrotonic acid, α-acetoxyacrylic acid, β-trans-aryloxyacrylic acid, α-chloro-β-E-methoxyacrylic acid, and β-diaminoacrylic acid.

Examples of dicarboxylic acids include maleic acid, fumaric acid, and itaconic acid.

Examples of derivatives of dicarboxylic acids include methylmaleic acid, dimethylmaleic acid, phenylmaleic acid, chloromaleic acid, dichloromaleic acid, fluoromaleic acid, and maleic acid esters such as methyl allyl maleate, diphenyl maleate, nonyl maleate, decyl maleate, dodecyl maleate, octadecyl maleate, and fluoroalkyl maleates.

Examples of acid anhydrides of dicarboxylic acids include maleic anhydride, acrylic anhydride, methylmaleic anhydride, and dimethylmaleic anhydride.

Furthermore, an acid anhydride that produces a carboxyl group upon hydrolysis can also be used as a carboxylic acid group-containing monomer.

Other examples include monoesters and diesters of α,β-ethylenically unsaturated polybasic carboxylic acids such as monoethyl maleate, diethyl maleate, monobutyl maleate, dibutyl maleate, monoethyl fumarate, diethyl fumarate, monobutyl fumarate, dibutyl fumarate, monocyclohexyl fumarate, dicyclohexyl fumarate, monoethyl itaconate, diethyl itaconate, monobutyl itaconate, and dibutyl itaconate.

Examples of sulfonate group-containing monomers include vinyl sulfonic acid, methyl vinyl sulfonic acid, (meth)allyl sulfonic acid, styrene sulfonic acid, (meth)acrylic acid-2-ethyl sulfonate, 2-acrylamido-2-methylpropane sulfonic acid, and 3-allyloxy-2-hydroxypropane sulfonic acid.

In this disclosure, "(meth)allyl" is used to indicate "allyl" and/or "methallyl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

In this disclosure, "(meth)acryloyl" is used to indicate "acryloyl" and/or "methacryloyl".

Examples of hydroxy group-containing monomers include ethylenically unsaturated alcohols such as (meth)allyl alcohol, 3-buten-1-ol, and 5-hexen-1-ol; alkanol esters of ethylenically unsaturated carboxylic acids such as 2-hydroxyethyl acrylate, 2-hydroxypropyl acrylate, 2-hydroxyethyl methacrylate, 2-hydroxypropyl methacrylate, di-2-hydroxyethyl maleate, di-4-hydroxybutyl maleate, and di-2-hydroxypropyl itaconate; esters of (meth)acrylic acid and polyalkylene glycol represented by a general formula $CH_2=CR^1-COO-(C_qH_{2q}O)_p-H$ (where p represents an integer of 2 to 9, q represents an integer of 2 to 4, and $R^1$ represents a hydrogen atom or a methyl group); mono(meth)acrylic acid esters of dihydroxy esters of dicarboxylic acids such as 2-hydroxyethyl-2'-(meth)acryloyloxy phthalate and 2-hydroxyethyl-2'-(meth)acryloyloxy succinate; vinyl ethers such as 2-hydroxyethyl vinyl ether and 2-hydroxypropyl vinyl ether; mono(meth)allyl ethers of alkylene glycols such as (meth)allyl-2-hydroxyethyl ether, (meth)allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether, and (meth)allyl-6-hydroxyhexyl ether; polyoxyalkylene glycol mono(meth)allyl ethers such as diethylene glycol mono(meth)allyl ether and dipropylene glycol mono(meth)allyl ether; mono(meth)allyl ethers of halogen or hydroxy substituted (poly)alkylene glycols such as glycerin mono(meth)allyl ether, (meth)allyl-2-chloro-3-hydroxypropyl ether, and (meth)allyl-2-hydroxy-3-chloropropyl ether; mono(meth)allyl ethers of polyhydric phenols such as eugenol and isoeugenol, and halogen substituted products thereof; and (meth)allyl thioethers of alkylene glycols such as (meth)allyl-2-hydroxyethyl thioether and (meth)allyl-2-hydroxypropyl thioether.

The percentage content of such other repeating units in the copolymer is preferably 25 mass % or less, more preferably 10 mass % or less, and even more preferably 1 mass % or less, and it is particularly preferable that the copolymer does not include any of such other repeating units. In other words, the copolymer is preferably composed by only the alkylene structural unit and the nitrile group-containing monomer unit. Through use of a copolymer in which the percentage content of such other repeating units is small, an electrode active material and a conductive material can be dispersed in high concentration while ensuring slurry composition coatability.

In particular, it is preferable that the above-described copolymer does not substantially include a hydrophilic group-containing monomer unit. In a case in which the copolymer includes a hydrophilic group-containing monomer unit as another repeating unit, the hydrophilic group promotes conductive material aggregation in a slurry composition. As a result, it may be difficult to produce a slurry composition in which a conductive material is dispersed in high concentration while ensuring coatability.

[[Mooney Viscosity ($ML_{1+4}$, 100° C.)]]

The Mooney viscosity ($ML_{1+4}$, 100° C.) of the copolymer is required to be at least 50 and not more than 200. Moreover, the Mooney viscosity ($ML_{1+4}$, 100° C.) of the copolymer is preferably 90 or more, more preferably 100 or more, and even more preferably 110 or more, and is preferably 150 or less, more preferably 130 or less, and even more preferably 120 or less. If the Mooney viscosity of the copolymer is less than the lower limit set forth above, it is not possible to obtain a slurry composition in which an electrode active material and a conductive material are both favorably dispersed because dense materials such as the electrode active material sediment in the slurry composition. Conversely, if the Mooney viscosity of the copolymer is more than the upper limit set forth above, it becomes difficult to ensure coatability of the slurry composition when the concentration of the copolymer in the slurry composition is high, and thus it becomes essential to maintain a low solid content concentration in the slurry composition to achieve both coatability and dispersibility. Consequently, it is not possible to obtain a slurry composition in which an electrode active material and a conductive material are dispersed in high concentration while ensuring coatability. Moreover, by setting the Mooney viscosity of the copolymer within any of the ranges set forth above, suitable molecular chain spreading for dispersing an electrode active material or conductive material can be obtained when the copolymer is used in a slurry composition, which enables further improvement of dispersion stability of the slurry composition.

The Mooney viscosity of the copolymer can be adjusted, for example, by altering the composition, structure (for example, straight chain ratio), molecular weight, or gel content ratio of the copolymer, altering production conditions of the copolymer (for example, the used amount of chain transfer agent, polymerization temperature, or conversion rate at the end point of polymerization), and so forth. In one specific example, the Mooney viscosity of the copolymer is reduced in a situation in which the amount of chain transfer agent used in production of the copolymer is increased.

The iodine value of the copolymer is preferably 3 mg/100 mg or more, and more preferably 8 mg/100 mg or more, and is preferably 60 mg/100 mg or less, more preferably 30 mg/100 mg or less, and even more preferably 10 mg/100 mg or less. When the iodine value of the copolymer is within any of the ranges set forth above, the copolymer is stable in terms of chemical structure at high-potential and electrode structure can be maintained even when cycling is performed over a long period, which means that a secondary battery having excellent high-temperature cycle characteristics can be provided. Note that the iodine value can be determined in accordance with JIS K 6235:2006.

[Production Method of Copolymer]

Although no specific limitations are placed on the production method of the copolymer set forth above, the copolymer may be produced, for example, by polymerizing a monomer composition containing the above-described monomers to obtain a copolymer, optionally in the presence of a chain transfer agent, and then hydrogenating the resultant copolymer.

Herein, the percentage content of each monomer in the monomer composition used to produce the copolymer can be set in accordance with the percentage content of each repeating unit in the copolymer.

The method of polymerization is not specifically limited and may, for example, be any of solution polymerization, suspension polymerization, bulk polymerization, and emulsion polymerization. Moreover, ionic polymerization, radical polymerization, living radical polymerization, or the like may be adopted as the polymerization reaction.

Furthermore, no specific limitations are placed on the method by which the polymer is hydrogenated, and a normal method using a catalyst may be adopted (for example, refer to WO 2012/165120 A1, WO 2013/080989 A1, and JP 2013-8485 A).

In a case in which a chain transfer agent is used in production of the copolymer, the amount of the chain transfer agent per 100 parts by mass, in total, of monomers in the monomer composition is preferably 0.1 parts by mass or more, and more preferably 0.15 parts by mass or more, and is preferably 0.6 parts by mass or less, and more preferably 0.5 parts by mass or less.

[Other Polymers]

The binder may include other polymers besides the specific copolymer set forth above. In a situation in which another polymer is also used as the binder, this other polymer may be mixed with the copolymer set forth above in production of a slurry composition for a secondary battery electrode.

Examples of other polymers that can function as a binder in conjunction with the copolymer set forth above include, but are not specifically limited to, polyacrylonitrile, polymethyl methacrylate, and fluorine-containing polymers such as polyvinylidene fluoride.

The proportion constituted by such other polymers in the binder is preferably 95 mass % or less, more preferably 60 mass % or less, even more preferably 40 mass % or less, further preferably 20 mass % or less, and particularly preferably 0 mass % (i.e., it is particularly preferable that the binder does not include other polymers). If the proportion constituted by such other polymers in the binder is high, it may not be possible to obtain an adequate conductive material dispersing effect through the copolymer, and thus it may not be possible to obtain a slurry composition in which an electrode active material and a conductive material are dispersed in high concentration.

Particularly in the case of a binder composition used to produce a slurry composition that contains a Ni-containing active material (active material that contains nickel) as an electrode active material, it is preferable that the proportion constituted by such other polymers in the binder is low (i.e., that the proportion constituted by the copolymer is high). Specifically, in the case of a binder composition used to produce a slurry composition that contains a Ni-containing active material as an electrode active material, the proportion constituted by the copolymer in the binder is preferably 60 mass % or more, more preferably 80 mass % or more, and even more preferably 100 mass %. A Ni-containing active material normally contains a residual alkali component from production of the Ni-containing active material. Therefore, when a Ni-containing active material is used in combination with such other polymers, and particularly with fluorine-containing polymers such as polyvinylidene fluoride, gelation of these other polymers may occur as a result of the alkali component eluting from the Ni-containing active material, and this may reduce slurry composition stability.

From a viewpoint of inhibiting gelation of the copolymer in a case in which the copolymer is used in combination with a Ni-containing active material, it is preferable that the proportion constituted by a fluorine-containing monomer unit among all repeating units in the copolymer is 0 mass % to 1 mass %.

<Solvent>

The solvent of the binder composition for a secondary battery electrode may be an organic solvent, but is not specifically limited thereto. Examples of organic solvents that can be used include alcohols such as methanol, ethanol, n-propanol, isopropanol, n-butanol, isobutanol, t-butanol, pentanol, hexanol, heptanol, octanol, nonanol, decanol, and amyl alcohol; ketones such as acetone, methyl ethyl ketone, and cyclohexanone; esters such as ethyl acetate and butyl acetate; ethers such as diethyl ether, dioxane, and tetrahydrofuran; amide-based polar organic solvents such as N,N-dimethylformamide and N-methylpyrrolidone (NMP); and aromatic hydrocarbons such as toluene, xylene, chlorobenzene, ortho-dichlorobenzene, and para-dichlorobenzene. One of these solvents may be used individually, or two or more of these solvents may be used as a mixture.

Of these examples, NMP is preferable as the solvent.

<Other Components>

Other than the above components, the presently disclosed binder composition for a secondary battery electrode may contain components such as a reinforcing agent, a leveling agent, a viscosity modifier, an electrolysis solution additive, and the like. These other components are not specifically limited so long as they do not affect the battery reactions and may be selected from commonly known components such as those described in WO 2012/115096 A1. One of such components may be used individually, or two or more of such components may be used in combination in a freely selected ratio.

(Slurry Composition for Secondary Battery Electrode)

The presently disclosed slurry composition for a secondary battery electrode contains an electrode active material, a conductive material, and the above-described binder composition, and may optionally further contain other components. In other words, the presently disclosed slurry composition for a secondary battery electrode contains an electrode active material, a conductive material, a binder including the above-described copolymer, and a solvent, and may optionally further contain other components. In the presently disclosed slurry composition for a secondary battery electrode, the electrode active material and the conductive material can be dispersed in high concentration while ensuring coatability as a result of the slurry composition containing the above-described binder composition. Consequently, an electrode that includes an electrode mixed material layer formed using the presently disclosed slurry composition for a secondary battery electrode enables a secondary battery to display excellent battery characteristics.

Although the following describes, as one example, a case in which the slurry composition for a secondary battery electrode is a slurry composition for a lithium ion secondary battery positive electrode, the presently disclosed slurry composition for a secondary battery electrode is not limited to the following example.

<Electrode Active Material>

The electrode active material is a substance that accepts and donates electrons in an electrode of a secondary battery. A substance that can occlude and release lithium is normally used as a positive electrode active material for a lithium ion secondary battery.

Note that although a substance having high specific gravity (for example, a density of 3.5 g/cm$^3$ or more) is typically used as the electrode active material, sedimentation of the electrode active material can be inhibited in the presently disclosed slurry composition for a secondary battery electrode because the binder composition containing the above-described copolymer is used therein.

Specific examples of positive electrode active materials for a lithium ion secondary battery that may be used include, but are not specifically limited to, known positive electrode active materials such as lithium-containing cobalt oxide ($LiCoO_2$), lithium manganate ($LiMn_2O_4$), lithium-containing nickel oxide ($LiNiO_2$), lithium-containing composite oxide of Co—Ni—Mn ($Li(Co\ Mn\ Ni)O_2$), lithium-containing composite oxide of Ni—Mn—Al, lithium-containing composite oxide of Ni—Co—Al, olivine-type lithium iron phosphate ($LiFePO_4$), olivine-type manganese lithium phosphate ($LiMnPO_4$), a $Li_2MnO_3$—$LiNiO_2$-based solid solution, lithium rich spinel compounds represented by $Li_{1+x}Mn_{2-x}O_4$ (0<x<2), $Li[Ni_{0.17}Li_{0.2}Co_{0.07}Mn_{0.56}]O_2$, and $LiNi_{0.5}Mn_{1.5}O_4$.

The amount and particle diameter of the positive electrode active material may be, but are not specifically limited to, the same as those of conventionally-used positive electrode active materials.

Of the foregoing examples, a positive electrode active material that includes a Ni-containing active material (active material that contains nickel) is preferable from a viewpoint of improving secondary battery capacity and the like, and a positive electrode active material that includes a Ni-containing active material represented by a general formula $LiNi_xCo_yM_{(1-x-y)}O_2$ [where M is at least one selected from the group consisting of manganese, magnesium, zirconium, molybdenum, tungsten, aluminum, chromium, vanadium, cerium, titanium, iron, potassium, gallium, and indium; and x and y satisfy relationship formulae 0<x≤1, 0≤y<1, and x+y≤1] is more preferable. Moreover, from a viewpoint of further improving secondary battery capacity, x in the preceding general formula is preferably 0.40 or more, and more preferably 0.60 or more.

<Conductive Material>

The conductive material ensures electrical contact amongst the electrode active material. Examples of conductive materials that can be used include conductive carbon materials such as carbon black (for example, acetylene black, Ketjen Black® (Ketjen black is a registered trademark in Japan, other countries, or both), and furnace black), graphite, carbon fiber, carbon flake, and carbon nanofiber (for example, carbon nanotubes and vapor-grown carbon fiber); and fibers and foils of various metals. Of these examples, carbon black is preferable and acetylene black is more preferable as the conductive material.

One of these conductive materials may be used individually, or two or more of these conductive materials may be used in combination.

The conductive material can be favorably and stably dispersed in the presently disclosed slurry composition for a secondary battery electrode even when, for example, a conductive material formed from a conductive carbon material is used. This is as a result of the binder composition containing the copolymer that includes an alkylene structural unit being used in the slurry composition.

The percentage content of the conductive material in the slurry composition for a secondary battery in terms of solid content is preferably 0.5 mass % or more, and more preferably 1.5 mass % or more, and is preferably 7 mass % or less, and more preferably 3.5 mass % or less. If the amount of the conductive material is too small, it may not be possible to ensure sufficient electrical contact amongst the electrode active material. Conversely, if the amount of the conductive material is too large, viscosity stability of the slurry composition may be reduced, and density of an electrode mixed material layer may be reduced, resulting in a secondary battery capacity that is not sufficiently high.

<Binder Composition>

The presently disclosed binder composition for a secondary battery electrode set forth above is used as the binder composition.

The percentage content of the binder composition in the slurry composition for a secondary battery electrode in terms of solid content is, for example, preferably 0.5 mass % or more, and more preferably 1 mass % or more, and is preferably 2 mass % or less. When the percentage content of the binder composition in the slurry composition in terms of solid content is 0.5 mass % or more, the electrode active material and the conductive material can be favorably dispersed in high concentration while ensuring coatability. Moreover, when the percentage content of the binder composition in the slurry composition in terms of solid content is 2 mass % or less, reduction in secondary battery capacity can be inhibited by restricting an increase in the proportion constituted by the binder in an electrode mixed material layer formed using the slurry composition.

<Other Components>

Examples of other components that may be contained in the slurry composition include, but are not specifically limited to, the same other components that may be contained in the presently disclosed binder composition. One of such other components may be used individually, or two or more of such other components may be used in combination in a freely selected ratio.

<Production of Slurry Composition>

The slurry composition set forth above can be produced by dissolving or dispersing the above-described components in a solvent such as an organic solvent. Specifically, the slurry composition can be produced by mixing the above-described components and the solvent using a mixer such as a ball mill, a sand mill, a bead mill, a pigment disperser, a grinding machine, an ultrasonic disperser, a homogenizer, a planetary mixer, or a FILMIX. Examples of solvents that can be used in production of the slurry composition include the same solvents as can be used in the presently disclosed binder composition. Moreover, the solvent contained in the binder composition may be used as a solvent in production of the slurry composition.

(Electrode for Secondary Battery)

The presently disclosed electrode for a secondary battery includes a current collector and an electrode mixed material layer formed on the current collector, wherein the electrode mixed material layer is formed using the slurry composition for a secondary battery electrode set forth above. In other words, the electrode mixed material layer contains at least an electrode active material, a conductive material, and a binder that includes a copolymer. It should be noted that components contained in the electrode mixed material layer are components that are contained in the previously described slurry composition for a secondary battery electrode. Furthermore, the preferred ratio of these components in the electrode mixed material layer is the same as the preferred ratio of these components in the slurry composition.

In the presently disclosed electrode for a secondary battery, a dense electrode mixed material layer can be favorably formed on the current collector using a slurry composition in which an electrode active material and a conductive material are favorably dispersed in high concentration as a result of a slurry composition that contains the presently disclosed binder composition for a secondary battery electrode being used. Accordingly, a secondary battery having excellent battery characteristics such as output characteristics can be obtained using this electrode.

<Production Method of Electrode>

The presently disclosed electrode for a secondary battery can be produced, for example, through a step of applying the previously described slurry composition onto a current collector (application step) and a step of drying the slurry composition that has been applied onto the current collector to form an electrode mixed material layer on the current collector (drying step).

[Application Step]

The slurry composition can be applied onto the current collector by any commonly known method without any specific limitations. Specific examples of application methods that can be used include doctor blading, dip coating, reverse roll coating, direct roll coating, gravure coating, extrusion coating, and brush coating. The slurry composition may be applied onto one side or both sides of the current collector. The thickness of the slurry coating on the current collector after application but before drying may be set as appropriate in accordance with the thickness of the electrode mixed material layer to be obtained after drying.

The current collector onto which the slurry composition is applied is a material having electrical conductivity and electrochemical durability. Specifically, the current collector may be made of, for example, iron, copper, aluminum, nickel, stainless steel, titanium, tantalum, gold, or platinum. One of the aforementioned materials may be used individually, or two or more of the aforementioned materials may be used in combination in a freely selected ratio.

[Drying Step]

The slurry composition that has been applied onto the current collector may be dried by any commonly known method without any specific limitations. Examples of drying methods that can be used include drying by warm, hot, or low-humidity air; drying in a vacuum; and drying by irradiation with infrared light, electron beams, or the like. Through drying of the slurry composition on the current collector in this manner, an electrode mixed material layer can be formed on the current collector, thereby providing an electrode for a secondary battery that includes the current collector and the electrode mixed material layer.

After the drying step, the electrode mixed material layer may be further subjected to a pressing process, such as mold pressing or roll pressing. The pressing process can improve close adherence between the electrode mixed material layer and the current collector. Furthermore, when the electrode mixed material layer contains a curable polymer, the polymer is preferably cured after the electrode mixed material layer has been formed.

It should be noted that as a result of the electrode active material and the conductive material being favorably dispersed in high concentration in the presently disclosed slurry composition for a secondary battery electrode, an electrode mixed material layer formed using this slurry composition has sufficiently high density and the internal structure thereof is not easily damaged even when the electrode mixed material layer is subjected to a pressing process. Accordingly, the battery characteristics of a secondary battery can be sufficiently improved through use of the presently disclosed slurry composition for a secondary battery electrode even in a case in which a pressing process or the like is performed in electrode production.

(Secondary Battery)

The presently disclosed secondary battery includes a positive electrode, a negative electrode, an electrolysis solution, and a separator. In the presently disclosed secondary battery, the presently disclosed electrode for a secondary battery is used as at least one of the positive electrode and negative electrode. The presently disclosed secondary battery has excellent battery characteristics such as output characteristics as a result of including the presently disclosed electrode for a secondary battery.

The presently disclosed secondary battery is preferably a secondary battery in which the presently disclosed electrode for a secondary battery is used as a positive electrode. Although the following describes, as one example, a case in which the secondary battery is a lithium ion secondary battery, the presently disclosed secondary battery is not limited to the following example.

<Electrodes>

Known electrodes that are used in production of secondary batteries can be used without any specific limitations in the presently disclosed secondary battery as an electrode other than the electrode for a secondary battery set forth above. Specifically, an electrode obtained by forming an electrode mixed material layer on a current collector by a known production method may be used as an electrode other than the electrode for a secondary battery set forth above.

<Electrolysis Solution>

The electrolysis solution is normally an organic electrolysis solution obtained by dissolving a supporting electrolyte in an organic solvent. The supporting electrolyte of a lithium ion secondary battery may, for example, be a lithium salt. Examples of the lithium salt include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable in that they easily dissolve in solvent and exhibit a high degree of dissociation, with $LiPF_6$ being particularly preferable. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolysis solution is not specifically limited so long as the supporting electrolyte dissolves therein. Examples of suitable organic solvents that can be used include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixed liquid of such solvents may be used. Of these solvents, carbonates are preferable for their high dielectric constant and broad stable potential region, and a mixture of ethylene carbonate and ethyl methyl carbonate is more preferable.

The concentration of the electrolyte in the electrolysis solution can be adjusted as appropriate and may, for example, be preferably 0.5 mass % to 15 mass %, more preferably 2 mass % to 13 mass %, and even more preferably 5 mass % to 10 mass %. Known additives such as fluoroethylene carbonate and ethyl methyl sulfone may be added to the electrolysis solution.

<Separator>

Examples of separators that can be used include, but are not specifically limited to, those described in JP 2012-204303 A. Of these separators, a fine porous membrane made of polyolefinic (polyethylene, polypropylene, polybutene, or polyvinyl chloride) resin is preferred because such a membrane can reduce the total thickness of the separator, which increases the ratio of electrode active material in the secondary battery, and consequently increases the capacity per volume.

<Production Method of Secondary Battery>

The presently disclosed secondary battery may be produced, for example, by stacking the positive electrode and the negative electrode with the separator in-between, rolling or folding the resultant stack as necessary in accordance with the battery shape to place the stack in a battery container, injecting the electrolysis solution into the battery container, and sealing the battery container. In order to prevent pressure increase inside the secondary battery and occurrence of overcharging or overdischarging, an overcurrent preventing device such as a fuse or a PTC device; an expanded metal; or a lead plate may be provided as necessary. The shape of the secondary battery may be a coin type, button type, sheet type, cylinder type, prismatic type, flat type, or the like.

EXAMPLES

The following provides a more specific description of the present disclosure based on examples. However, the present disclosure is not limited to the following examples. In the following, "%" and "parts" used to express quantities are by mass, unless otherwise specified.

The following methods were used in the examples and comparative examples to measure and evaluate the composition and Mooney viscosity of a copolymer, the viscosity stability, sedimentation, and solid content concentration of a slurry composition, and the output characteristics of a secondary battery.

<Composition of Copolymer>

After coagulating 100 g of a water dispersion of a copolymer in 1 L of methanol, vacuum drying was performed for 12 hours at a temperature of 60° C. The proportions of repeating units included in the resultant copolymer were measured by $^1$H-NMR.

<Mooney Viscosity of Copolymer>

After coagulating a water dispersion of a copolymer in methanol, vacuum drying was performed for 12 hours at a temperature of 60° C. The Mooney viscosity was then measured in accordance with JIS K 6300-1 at a temperature of 100° C. using 40 g of the resultant copolymer.

<Viscosity Stability of Slurry Composition>

An obtained slurry composition was placed in a tightly sealed vessel and was stored for 5 days at 25° C. while being stirred using a mix rotor at a rotation speed of 60 rpm. The viscosity $\eta_0$ of the slurry composition before storage (straight after production) and the viscosity m of the slurry composition after storage for 5 days were measured using a B-type viscometer (rotation speed: 60 rpm). The viscosity stability was calculated by the following formula and was evaluated by the following criteria. A viscosity stability value closer to 100% indicates better dispersion stability of a conductive material and the like.

Viscosity stability=$(\eta_1/\eta_0) \times 100\%$

A: Viscosity stability of at least 90% and not more than 110%
B: Viscosity stability of at least 80% and less than 90%
C: Viscosity stability of at least 70% and less than 80%
D: Viscosity stability of less than 70% or more than 110%

<Sedimentation of Slurry Composition>

An obtained slurry composition was left at rest without stirring and the occurrence of sedimentation of an electrode active material or the like was checked after the slurry composition had been left for 5 days at 25° C. Evaluation was performed by the following criteria.

A: Sedimentation does not occur
B: Sedimentation occurs

<Solid Content Concentration of Slurry Composition>

Solid content concentration was determined with respect to a slurry composition that had been produced such as to have a viscosity of 4,000 mPa·s as measured at 25° C. using a B-type viscometer (rotation speed: 60 rpm), and the determined solid content concentration was evaluated by the following criteria. A higher solid content concentration indicates that an electrode active material and a conductive material can be dispersed in high concentration while ensuring coatability of the slurry composition.

A: Solid content concentration of 70 mass % or more
B: Solid content concentration of at least 60 mass % and less than 70 mass %
C: Solid content concentration of at least 50 mass % and less than 60 mass %
D: Solid content concentration of less than 50 mass %

<Output Characteristics of Secondary Battery>

A produced secondary battery was constant-current charged at 0.2 CmA to a battery voltage of 4.2 V at an ambient temperature of 25° C. and was then constant-voltage charged at 4.2 V until the charging current reached 0.02 CmA. Next, the secondary battery was constant-current discharged at 0.2 CmA to a battery voltage of 3.0 V at an ambient temperature of 25° C. and the initial capacity of the secondary battery was measured. Thereafter, the secondary battery for which the initial capacity had been measured was constant-current charged at 0.2 CmA to a battery voltage of 4.2 V at an ambient temperature of 25° C. and was then constant-voltage charged at 4.2 V until the charging current reached 0.02 CmA. Next, the secondary battery was constant-current discharged at 3 CmA to a battery voltage of 3.0 V at an ambient temperature of 25° C. and the 3C capacity of the secondary battery was measured. An output characteristic (={(3C capacity)/(initial capacity)}×100%) was calculated and was evaluated by the following criteria.

A: Output characteristic of 90% or more
B: Output characteristic of at least 87% and less than 90%
C: Output characteristic of at least 84% and less than 87%
D: Output characteristic of at least 81% and less than 84%
E: Output characteristic of less than 81%

Example 1

<Production of Copolymer>

An autoclave equipped with a stirrer was charged with 240 parts of deionized water, 2.5 parts of sodium alkylbenzenesulfonate as an emulsifier, 35 parts of acrylonitrile as a nitrile group-containing monomer, and 0.25 parts of t-dodecyl mercaptan as a chain transfer agent in this order. The inside of the autoclave was purged with nitrogen and then 65 parts of 1,3-butadiene as a conjugated diene monomer was fed into the autoclave under pressure and 0.25 parts of ammonium persulfate was added as a polymerization initiator to perform a polymerization reaction at a reaction temperature of 40° C. Through this reaction, a copolymer of acrylonitrile and 1,3-butadiene was obtained. The polymerization conversion rate was 85%.

Deionized water was added to the resultant copolymer to obtain a solution adjusted to a total solid content concentration of 12 mass %. An autoclave of 1 L in capacity equipped with a stirrer was charged with 400 mL of the resultant solution (total solid content: 48 g), and nitrogen gas was passed through the solution for 10 minutes to remove dissolved oxygen present in the solution. Thereafter, 75 mg of palladium acetate as a hydrogenation reaction catalyst was dissolved in 180 mL of deionized water to which nitric acid had been added in an amount of 4 molar equivalents of the palladium (Pd), and the resultant solution was added into the autoclave. The system was purged twice with hydrogen gas, and then the contents of the autoclave were heated to 50° C. in a state in which the pressure was increased to 3 MPa with hydrogen gas and a hydrogenation reaction (first stage hydrogenation reaction) was performed for 6 hours.

The autoclave was subsequently returned to atmospheric pressure. Then, 25 mg of palladium acetate as a hydrogenation reaction catalyst was dissolved in 60 mL of deionized water to which nitric acid had been added in an amount of 4 molar equivalents of the Pd, and the resultant solution was added to the autoclave. The system was purged twice with hydrogen gas, and then the contents of the autoclave were heated to 50° C. in a state in which the pressure was increased to 3 MPa with hydrogen gas and a hydrogenation reaction (second stage hydrogenation reaction) was performed for 6 hours.

Next, the contents of the autoclave were returned to normal temperature and the system was changed to a nitrogen atmosphere. Thereafter, the contents were concentrated to a solid content concentration of 40% using an evaporator to yield a water dispersion of a copolymer.

The composition and Mooney viscosity of the resultant copolymer were measured. The results are shown in Table 1.

<Production of Binder Composition>

A binder composition containing a copolymer that included an alkylene structural unit (hydrogenated 1,3-butadiene unit) and a nitrile group-containing monomer unit (acrylonitrile unit) was obtained by adding 320 parts of N-methylpyrrolidone (NMP) as a solvent to 100 parts of the obtained water dispersion of the copolymer and then evaporating water under reduced pressure.

<Production of Slurry Composition for Secondary Battery Positive Electrode>

A slurry composition was obtained by using a planetary mixer to mix 95.5 parts of $LiNi_{0.9}Co_{0.1}O_2$ (Ni-containing active material) as a positive electrode active material, 3 parts of acetylene black (BET specific surface area: 69 m$^2$/g) as a conductive material, 1.5 parts in terms of solid content of the binder composition, and N-methylpyrrolidone (NMP) as a solvent, and then adding further NMP to the resultant mixture to adjust the viscosity to 4,000 mPa·s as measured by a B-type viscometer (rotation speed: 60 rpm).

The obtained slurry composition was used to evaluate viscosity stability, sedimentation, and solid content concentration. The results are shown in Table 1.

<Production of Positive Electrode for Secondary Battery>

Aluminum foil of 15 μm in thickness was prepared as a current collector. The obtained slurry composition was applied onto one side of the aluminum foil such as to have a coating weight after drying of 20 mg/cm$^2$, and was dried for 20 minutes at 60° C. and 20 minutes at 120° C. to obtain a positive electrode web. This positive electrode web was then rolled by roll pressing to produce a positive electrode in the form of a sheet including the aluminum foil and a positive electrode mixed material layer having a density of 3.5 g/cm$^3$.

<Production of Negative Electrode for Secondary Battery>

A planetary mixer equipped with a disper blade was charged with 100 parts of artificial graphite (volume-average particle diameter: 24.5 μm, specific surface area: 4 m$^2$/g) as a negative electrode active material and 1 part in terms of solid content of a 1% aqueous solution of carboxymethyl cellulose (BSH-12 produced by DKS Co., Ltd.) as a dispersant. The contents of the planetary mixer were adjusted to a solid content concentration of 55% with deionized water and were then mixed for 60 minutes at 25° C. Next, the solid content concentration was adjusted to 52% with deionized water. Thereafter, mixing was performed for 15 minutes at 25° C. to yield a mixed liquid.

Next, 1.0 parts in terms of solid content of a 40% water dispersion of a styrene-butadiene copolymer (glass transition temperature: −15° C.) as a binder and deionized water were added to the mixed liquid obtained as described above, the final solid content concentration was adjusted to 50%, and mixing was performed for 10 minutes. The resultant mixed liquid was subjected to a defoaming process under reduced pressure to yield a slurry composition for a negative electrode having good fluidity.

The obtained slurry composition for a negative electrode was applied onto copper foil (current collector) of 20 μm in thickness using a comma coater such as to have a film thickness after drying of approximately 150 μm. The slurry composition for a negative electrode was then dried by conveying the copper foil inside of a 60° C. oven for 2 minutes at a speed of 0.5 m/minute. Heat treatment was subsequently performed for 2 minutes at 120° C. to obtain a negative electrode web. The negative electrode web was rolled by roll pressing to obtain a negative electrode including a negative electrode mixed material layer of 80 μm in thickness.

<Preparation of Separator for Secondary Battery>

A single layer separator made of polypropylene (width: 65 mm, length: 500 mm, thickness: 25 μm, produced by a dry method, porosity: 55%) was cut out as a 5 cm×5 cm square.

<Production of Secondary Battery>

An aluminum packing case was prepared as a battery case. The positive electrode obtained as described above was cut out as a 4 cm×4 cm square and was positioned such that a surface at the current collector side of the positive electrode was in contact with the aluminum packing case. The square separator obtained as described above was positioned on the positive electrode mixed material layer of the positive electrode. The negative electrode obtained as described above was cut out as a 4.2 cm×4.2 cm square and was positioned on the separator such that a surface at the negative electrode mixed material layer side of the negative electrode faced the separator. The aluminum packing case was then filled with an electrolysis solution formed from a $LiPF_6$ solution of 1.0 M in concentration that contained 1.5% of vinylene carbonate (VC). The solvent of the $LiPF_6$ solution was a mixed solvent of ethylene carbonate (EC) and ethyl methyl carbonate (EMC) (EC/EMC=3/7 (volume ratio)). The aluminum packing case was then closed by heat sealing at 150° C. to tightly seal an opening of the aluminum packing case, and thereby obtain a lithium ion secondary battery.

The obtained lithium ion secondary battery was used to evaluate output characteristics. The results are shown in Table 1.

Example 2

A copolymer, a binder composition, a slurry composition, a positive electrode, a negative electrode, and a secondary battery were produced in the same way as in Example 1 with the exception that in production of the copolymer, the amount of acrylonitrile was changed to 23 parts and the amount of 1,3-butadiene was changed to 77 parts. Moreover, evaluations were performed in the same way as in Example 1. The results are shown in Table 1.

Example 3

A copolymer, a binder composition, a slurry composition, a positive electrode, a negative electrode, and a secondary battery were produced in the same way as in Example 1 with the exception that in production of the copolymer, the amount of acrylonitrile was changed to 52 parts and the amount of 1,3-butadiene was changed to 48 parts. Moreover, evaluations were performed in the same way as in Example 1. The results are shown in Table 1.

Examples 4 and 5

A copolymer, a binder composition, a slurry composition, a positive electrode, a negative electrode, and a secondary battery were produced in the same way as in Example 1 with the exception that in production of the copolymer, the amount of t-dodecyl mercaptan was changed to 0.45 parts (Example 4) or 0.18 parts (Example 5). Moreover, evaluations were performed in the same way as in Example 1. The results are shown in Table 1.

Example 6

A copolymer, a binder composition, a slurry composition, a positive electrode, a negative electrode, and a secondary battery were produced in the same way as in Example 1 with the exception that in production of the copolymer, 20 parts of n-butyl acrylate as a (meth)acrylic acid ester monomer was charged to the autoclave with 35 parts of acrylonitrile, and the amount of 1,3-butadiene was changed to 45 parts. Moreover, evaluations were performed in the same way as in Example 1. The results are shown in Table 1.

Examples 7 and 8

A copolymer, a binder composition, a slurry composition, a positive electrode, a negative electrode, and a secondary battery were produced in the same way as in Example 1 with the exception that in production of the slurry composition for a secondary battery positive electrode, the slurry composition for a secondary battery positive electrode was obtained by adding, as a binder, the copolymer-containing binder composition and polyvinylidene fluoride as another polymer such that the amount of the copolymer as a proportion relative to the total amount of the copolymer and the polyvinylidene fluoride was 70 mass % (Example 7) or 50 mass % (Example 8). Moreover, evaluations were performed in the same way as in Example 1. The results are shown in Table 1.

Example 9

A copolymer, a binder composition, a slurry composition, a positive electrode, a negative electrode, and a secondary battery were produced in the same way as in Example 1 with the exception that in production of the copolymer, 3 parts of methacrylic acid as a hydrophilic group-containing monomer was charged to the autoclave with 35 parts of acrylonitrile, and the amount of 1,3-butadiene was changed to 62 parts. Moreover, evaluations were performed in the same way as in Example 1. The results are shown in Table 1.

Comparative Example 1

A slurry composition, a positive electrode, a negative electrode, and a secondary battery were produced in the same way as in Example 1 with the exception that a binder composition obtained by dissolving polyvinylidene fluoride in N-methylpyrrolidone (NMP) as a solvent was used and a copolymer was not used. Moreover, evaluations were performed in the same way as in Example 1. The results are shown in Table 1.

Comparative Example 2

A copolymer, a binder composition, a slurry composition, a positive electrode, a negative electrode, and a secondary battery were produced in the same way as in Example 1 with the exception that in production of the copolymer, the amount of t-dodecyl mercaptan was changed to 0.05 parts. Moreover, evaluations were performed in the same way as in Example 1. The results are shown in Table 1.

Comparative Example 3

Production of a copolymer, a binder composition, a slurry composition, a positive electrode, a negative electrode, and a secondary battery was attempted in the same way as in Example 1 with the exception that in production of the copolymer, the amount of t-dodecyl mercaptan was changed to 0.7 parts. However, it was not possible to evaluate the slurry composition or to produce a positive electrode and a secondary battery using the slurry composition due to severe sedimentation of the positive electrode active material in the slurry composition.

In Table 1, shown below:
"H-BD" indicates hydrogenated 1,3-butadiene unit;
"AN" indicates acrylonitrile unit;
"BA" indicates n-butyl acrylate unit;
"MAA" indicates methacrylic acid unit;
"TDM" indicates t-dodecyl mercaptan; and
"PVDF" indicates polyvinylidene fluoride.

TABLE 1

|  |  |  | Example 1 | Example 2 | Example 3 | Example 4 | Example 5 | Example 6 |
|---|---|---|---|---|---|---|---|---|
| Slurry composition | Positive electrode active material ($LiNi_{0.9}Co_{0.1}O_2$) | Amount [parts by mass] | 95.5 | 95.5 | 95.5 | 95.5 | 95.5 | 95.5 |
|  | Conductive material (acetylene black) | Amount [parts by mass] | 3 | 3 | 3 | 3 | 3 | 3 |
|  | Binder Copolymer Composition | H-BD [mass %] | 65 | 77 | 48 | 65 | 65 | 45 |
|  |  | AN [mass %] | 35 | 23 | 52 | 35 | 35 | 35 |
|  |  | BA [mass %] | — | — | — | — | — | 20 |
|  |  | MAA [mass %] | — | — | — | — | — | — |
|  |  | Amount of chain transfer agent (TDM) [parts by mass/100 parts by mass of monomer] | 0.25 | 0.25 | 0.25 | 0.45 | 0.18 | 0.25 |
|  |  | Mooney viscosity ($ML_{1+4}$, 100° C.) [—] | 110 | 115 | 120 | 70 | 140 | 100 |
|  | Other polymers |  | — | — | — | — | — | — |
|  | Content ratio (copolymer/other polymers) [mass ratio] |  | 100/0 | 100/0 | 100/0 | 100/0 | 100/0 | 100/0 |
|  | Amount (in terms of solid content) [parts by mass] |  | 1.5 | 1.5 | 1.5 | 1.5 | 1.5 | 1.5 |
| Evaluation | Viscosity stability |  | A | B | B | A | A | B |
|  | Sedimentation |  | A | A | A | B | A | B |
|  | Solid content concentration |  | A | A | A | A | B | B |
|  | Output characteristics |  | A | A | A | A | B | B |

|  |  |  | Example 7 | Example 8 | Example 9 | Comparative Example 1 | Comparative Example 2 | Comparative Example 3 |
|---|---|---|---|---|---|---|---|---|
| Slurry composition | Positive electrode active material ($LiNi_{0.9}Co_{0.1}O_2$) | Amount [parts by mass] | 95.5 | 95.5 | 95.5 | 95.5 | 95.5 | 95.5 |
|  | Conductive material (acetylene black) | Amount [parts by mass] | 3 | 3 | 3 | 3 | 3 | 3 |
|  | Binder Copolymer Composition | H-BD [mass %] | 65 | 65 | 62 | — | 65 | 65 |
|  |  | AN [mass %] | 35 | 35 | 35 | — | 35 | 35 |
|  |  | BA [mass %] | — | — | — | — | — | — |

TABLE 1-continued

|  |  |  |  |  |  |  |
|---|---|---|---|---|---|---|
| MAA [mass %] | — | — | 3 | — | — | — |
| Amount of chain transfer agent (TDM) [parts by mass/100 parts by mass of monomer] | 0.25 | 0.25 | 0.25 | — | 0.05 | 0.7 |
| Mooney viscosity ($ML_{1+4}$, 100° C.) [—] | 110 | 110 | 113 | — | 240 | 35 |
| Other polymers | PVDF | PVDF | — | PVDF | — | — |
| Content ratio (copolymer/other polymers) [mass ratio] | 70/30 | 50/50 | 100/0 | 0/100 | 100/0 | 100/0 |
| Amount (in terms of solid content) [parts by mass] | 1.5 | 1.5 | 1.5 | 1.5 | 1.5 | 1.5 |
| Evaluation — Viscosity stability | B | B | B | D | B | — |
| Sedimentation | A | A | B | B | B | — |
| Solid content concentration | B | C | C | D | D | — |
| Output characteristics | B | C | B | E | D | — |

In can be seen from Table 1 that in the case of Examples 1 to 9 in which a binder composition for a secondary battery electrode was used that, as a binder, contained a copolymer including an alkylene structural unit and a nitrile group-containing monomer unit, and having a specific Mooney viscosity, it was possible to favorably disperse the electrode active material and the conductive material in high concentration while ensuring coatability in production of the slurry composition, and thereby obtain a secondary battery having excellent output characteristics.

Moreover, it can be seen from Table 1 that in the case of Comparative Examples 1 to 3 in which a binder composition was used that, as a binder, only contained a polymer that did not include an alkylene structural unit and a nitrile group-containing monomer unit or in which a binder composition was used that, as a binder, contained a copolymer that did not have a specific Mooney viscosity, it was not possible to favorably disperse the electrode active material and the conductive material in high concentration while ensuring coatability in production of the slurry composition, and the obtained secondary battery had reduced output characteristics.

INDUSTRIAL APPLICABILITY

According to this disclosure, it is possible to provide a binder composition for a secondary battery electrode that, when used in production of a slurry composition for a secondary battery electrode, enables favorable dispersion of an electrode active material and a conductive material in high concentration while ensuring coatability.

Moreover, according to this disclosure, it is possible to provide a slurry composition for a secondary battery electrode in which an electrode active material and a conductive material are favorably dispersed in high concentration while ensuring coatability.

Furthermore, according to this disclosure, it is possible to provide an electrode for a secondary battery that enables sufficient improvement of battery characteristics of a secondary battery and a secondary battery having excellent battery characteristics such as output characteristics.

The invention claimed is:

1. A binder composition for a secondary battery electrode comprising a binder and an organic solvent, wherein the binder includes a copolymer in a proportion of 60 mass % or more, the copolymer includes an alkylene structural unit and a nitrile group-containing monomer unit, and the copolymer has a Mooney viscosity $ML_{1+4}$ of at least 110 and not more than 200 as measured in accordance with JIS K 6300-1 at a temperature of 100° C.

2. The binder composition for a secondary battery electrode according to claim 1, wherein the copolymer includes the alkylene structural unit in a proportion of at least 40 mass % and not more than 80 mass %.

3. The binder composition for a secondary battery electrode according to claim 1, wherein the copolymer includes the nitrile group-containing monomer unit in a proportion of at least 10 mass % and not more than 55 mass %.

4. The binder composition for a secondary battery electrode according to claim 1, wherein a proportion constituted by a hydrophilic group-containing monomer unit among all repeating units in the copolymer is 0 mass % or more and less than 0.05 mass %.

5. A slurry composition for a secondary battery electrode comprising:

an electrode active material;

a conductive material; and the binder composition for a secondary battery electrode according to claim 1.

6. The slurry composition for a secondary battery electrode according to claim 5, wherein the electrode active material includes a Ni-containing active material.

7. An electrode for a secondary battery comprising an electrode mixed material layer formed using the slurry composition for a secondary battery electrode according to claim 5.

8. A secondary battery comprising the electrode for a secondary battery according to claim 7.

9. The binder composition for a secondary battery electrode according to claim 1, wherein the copolymer does not include a (meth)acrylic acid ester monomer unit and a hydrophilic group-containing monomer unit.

* * * * *